(12) United States Patent
Ogura

(10) Patent No.: US 8,997,523 B2
(45) Date of Patent: Apr. 7, 2015

(54) METHOD OF MANUFACTURING GLASS MOLDING

(75) Inventor: Kazuyuki Ogura, Yao (JP)

(73) Assignee: Konica Minolta Opto, Inc., Tokyo (JP)

(*) Notice: Subject to any disclaimer, the term of this patent is extended or adjusted under 35 U.S.C. 154(b) by 156 days.

(21) Appl. No.: 13/237,523

(22) Filed: Sep. 20, 2011

(65) Prior Publication Data

US 2012/0096900 A1 Apr. 26, 2012

(30) Foreign Application Priority Data

Oct. 22, 2010 (JP) ................................. 2010-237289

(51) Int. Cl.
*C03B 11/08* (2006.01)

(52) U.S. Cl.
CPC ............. *C03B 11/08* (2013.01); *C03B 2215/49* (2013.01); *C03B 2215/61* (2013.01)

(58) Field of Classification Search
CPC  C03B 11/08; C03B 2215/49; C03B 2215/50; C03B 2215/61; C03B 2215/76
USPC ................................. 65/66, 90, 127, 226, 305
See application file for complete search history.

(56) References Cited

U.S. PATENT DOCUMENTS

| | | | |
|---|---|---|---|
| 7,341,442 B2* | 3/2008 | Yen ................................. 425/394 |
| 7,415,842 B2 | 8/2008 | Sakata et al. | |
| 2002/0139145 A1* | 10/2002 | Murakami ...................... 65/102 |
| 2005/0178157 A1* | 8/2005 | Yoneda ............................ 65/32.1 |
| 2007/0119212 A1* | 5/2007 | Huang et al. ...................... 65/26 |
| 2007/0204654 A1* | 9/2007 | Fukumoto et al. ........... 65/29.19 |
| 2008/0104996 A1* | 5/2008 | Minazawa ......................... 65/66 |
| 2010/0077799 A1 | 4/2010 | Tada et al. | |
| 2010/0313603 A1* | 12/2010 | Fukumoto et al. ................ 65/66 |

FOREIGN PATENT DOCUMENTS

| | | |
|---|---|---|
| JP | 61-146721 A | 4/1986 |
| JP | 8-40726 A | 2/1996 |
| JP | 2005-320199 A | 11/2005 |
| JP | 2010-83724 A | 4/2010 |

OTHER PUBLICATIONS

Machine translation of JP2005-320199A. Accessed May 16, 2014. Patent original publication date Nov. 17, 2005.*
Machine translation of JP 08-040726A. Accessed May 16, 2014. Patent original publication date Feb. 13, 1996.*
Japanese Office Action mailed Jan. 7, 2014 regarding corresponding Japanese patent application 2010-237289.

* cited by examiner

*Primary Examiner* — Cynthia Szewczyk
(74) *Attorney, Agent, or Firm* — Brinks Gilson & Lione

(57) ABSTRACT

In a method of manufacturing a glass molding, a lower mold includes a recess having a bottom portion and a side portion surrounding the bottom portion, and an outer peripheral planar portion surrounding an upper end of the side portion. A crossing angle between the side portion and the outer peripheral planar portion is set at more than or equal to 45 degrees. A dropping volume of the molten glass drop is such that, when dropped onto the lower mold, a volume of the molten glass drop located above the outer peripheral planar portion is 1.5 times to 6.0 times the volume of the molten glass drop filling the recess.

25 Claims, 19 Drawing Sheets

FIG.3
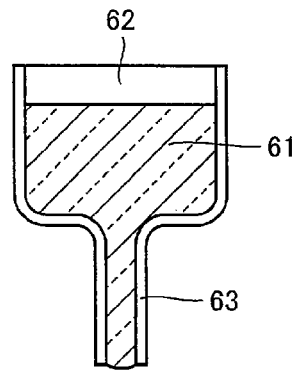
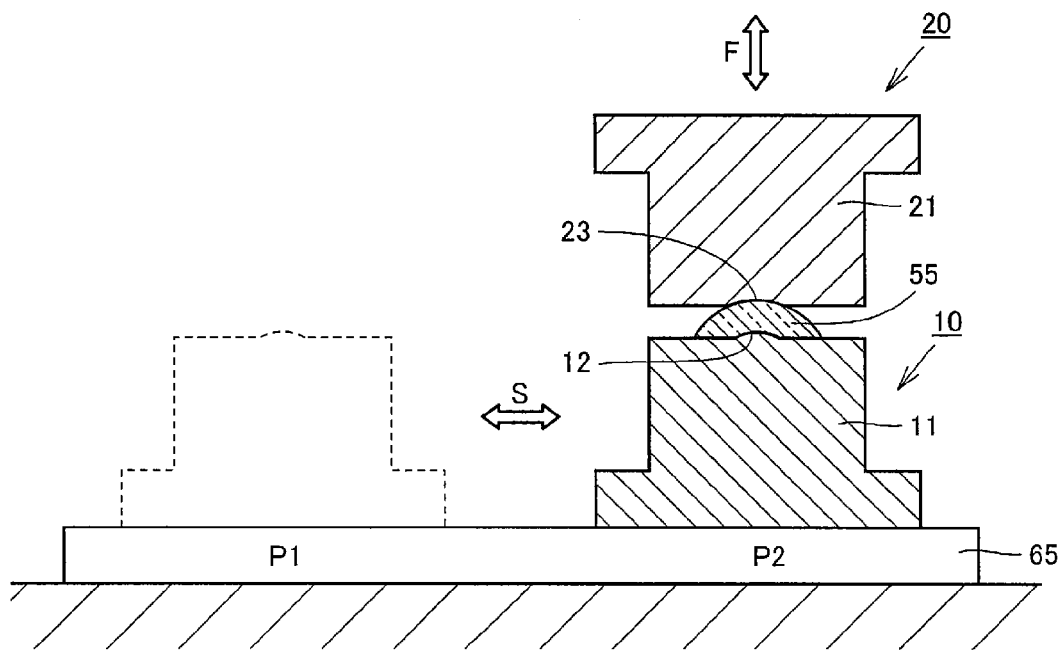

FIG.14

| | | CONDITION 1 | CONDITION 2 | CONDITION 3 | CONDITION 4 | CONDITION 5 | CONDITION 6 | CONDITION 7 |
|---|---|---|---|---|---|---|---|---|
| TOTAL MASS | | 250.0 | 250.0 | 250.0 | 250.0 | 250.0 | 250.0 | 250.0 |
| MASS IN RECESS (Q1) | | 125.0 | 111.1 | 100.0 | 50.0 | 35.7 | 33.3 | 27.8 |
| OVERFLOWING MASS (Q2) | | 125.0 | 138.9 | 150.0 | 200.0 | 214.3 | 216.7 | 222.2 |
| RATIO OF Q2/Q1 | | 1.00 | 1.25 | 1.50 | 4.00 | 6.00 | 6.50 | 8.00 |
| AMOUNT OF DISPLACEMENT OF LOWER MOLD (mm) | 0.00 | 0/20 | 0/20 | 0/20 | 0/20 | 0/20 | 0/20 | 0/20 |
| | 0.10 | 12/20 | 8/20 | 0/20 | 0/20 | 0/20 | 6/20 | 12/20 |
| | 0.20 | 20/20 | 13/20 | 0/20 | 0/20 | 0/20 | 12/20 | 20/20 |
| | 0.30 | 20/20 | 20/20 | 1/20 | 0/20 | 2/20 | 20/20 | 20/20 |

| | CONDITION 1 | CONDITION 2 | CONDITION 3 | CONDITION 4 | CONDITION 5 | CONDITION 6 | CONDITION 7 |
|---|---|---|---|---|---|---|---|
| RECESS DEPTH d (mm) | 2.10 | 1.97 | 1.85 | 1.22 | 0.97 | 0.92 | 0.81 |
| RECESS OPENING DIAMETER W1 (mm) | 6.52 | 6.30 | 6.10 | 5.04 | 4.62 | 4.54 | 4.36 |

(A) CONDITION 1

(B) CONDITION 7

FIG.16

| | | CONDITION 1 | CONDITION 2 | CONDITION 3 | CONDITION 4 | CONDITION 5 | CONDITION 6 | CONDITION 7 |
|---|---|---|---|---|---|---|---|---|
| TOTAL MASS | | 40.0 | 45.0 | 50.0 | 100.0 | 140.0 | 150.0 | 180.0 |
| MASS IN RECESS (Q1) | | 20.0 | 20.0 | 20.0 | 20.0 | 20.0 | 20.0 | 20.0 |
| OVERFLOWING MASS (Q2) | | 20.0 | 25.0 | 30.0 | 80.0 | 120.0 | 130.0 | 160.0 |
| RATIO OF Q2/Q1 | | 1.00 | 1.25 | 1.50 | 4.00 | 6.00 | 6.50 | 8.00 |
| AMOUNT OF DISPLACEMENT OF LOWER MOLD (mm) | 0.00 | 0/20 | 0/20 | 0/20 | 0/20 | 0/20 | 0/20 | 0/20 |
| | 0.10 | 12/20 | 9/20 | 0/20 | 0/20 | 0/20 | 3/20 | 8/20 |
| | 0.20 | 20/20 | 15/20 | 0/20 | 0/20 | 0/20 | 10/20 | 18/20 |
| | 0.30 | 20/20 | 20/20 | 2/20 | 1/20 | 1/20 | 18/20 | 20/20 |

| | CONDITION 1 | CONDITION 2 | CONDITION 3 | CONDITION 4 | CONDITION 5 | CONDITION 6 | CONDITION 7 |
|---|---|---|---|---|---|---|---|
| RECESS DEPTH d (mm) | 0.98 | 0.98 | 0.98 | 0.98 | 0.98 | 0.98 | 0.98 |
| RECESS OPENING DIAMETER W1 (mm) | 3.64 | 3.64 | 3.64 | 3.64 | 3.64 | 3.64 | 3.64 |

FIG.18

| ANGLE ABOUT RECESS | | CONDITION 1 | CONDITION 2 | CONDITION 3 | CONDITION 4 |
|---|---|---|---|---|---|
| | TOTAL MASS | 180.0 | 180.0 | 180.0 | 180.0 |
| | MASS IN RECESS (Q1) | 20.0 | 20.0 | 20.0 | 20.0 |
| | OVERFLOWING MASS (Q2) | 160.0 | 160.0 | 160.0 | 160.0 |
| | RATIO OF Q2/Q1 | 8.0 | 8.0 | 8.0 | 8.0 |
| 20° | | 20/20 | | | |
| 30° | | | 12/20 | | |
| 45° | | | | 0/20 | |
| 60° | | | | | 0/20 |

| | CONDITION 1 | CONDITION 2 | CONDITION 3 | CONDITION 4 |
|---|---|---|---|---|
| RECESS DEPTH d (mm) | 0.58 | 0.72 | 0.91 | 1.13 |
| RECESS OPENING DIAMETER W1 (mm) | 5.18 | 4.50 | 3.82 | 3.30 |

METHOD OF MANUFACTURING GLASS MOLDING

This application is based on Japanese Patent Application No. 2010-237289 filed with the Japan Patent Office on Oct. 22, 2010, the entire content of which is hereby incorporated by reference.

BACKGROUND OF THE INVENTION

1. Field of the Invention

The present invention relates to a method of manufacturing a glass molding obtained by press molding a molten glass drop.

2. Description of the Related Art

In recent years, a glass optical element is widely used as a lens for digital camera, an optical pickup lens for DVD or the like, a camera lens for cellular phone, a coupling lens for optical communications, and the like. A glass molding manufactured by press molding a glass material with a mold is widely used as such a glass optical element.

As a method of manufacturing such a glass molding, a method of producing beforehand a glass preform having a predetermined mass and shape, and heating and press molding this glass preform with a mold to obtain a glass molding (hereinafter also referred to as a "reheat press method"), and a method in which a dropped molten glass drop is received by a lower mold, and the received molten glass drop is press molded to obtain a glass molding (hereinafter also referred to as a "droplet molding method") are known.

Attention is being focused on the droplet molding method since a glass molding can be manufactured directly from a molten glass drop without the need to repeat heating and cooling of a mold and the like, which can significantly shorten the time required for a single molding. A method of manufacturing a glass molding using such a droplet molding method is disclosed in Japanese Laid-Open Patent Publication No. 61-146721.

In the method of manufacturing a glass molding using the droplet molding method, the position of a molten glass drop with respect to a molding surface of a lower mold when the molten glass drop is dropped onto the lower mold is of importance for improving the glass molding in precision.

U.S. Pat. No. 7,415,842 defines the shape of a lower mold and the drop amount of a molten glass drop such that space is left between the molding surface of the lower mold and the molten glass drop at the border between the molding surface of the lower mold and the outer peripheral surface.

In recent years, further improvement in precision is demanded of glass moldings while miniaturization of glass moldings is required, which raises an issue of reduced manufacturing yield.

SUMMARY OF THE INVENTION

The present invention has an object to solve the above-described problems, and to provide a method of manufacturing a glass molding capable of obtaining further improved precision of the glass molding even when the glass molding is miniaturized.

A method of manufacturing a glass molding based on the present invention is a method of manufacturing a glass molding, using a lower mold and an upper mold, dropping a molten glass drop onto the lower mold, and then press molding the molten glass drop with the lower mold and the upper mold. The lower mold includes a recess having a bottom portion and a side portion surrounding the bottom portion, and an outer peripheral planar portion surrounding an upper end of the side portion. A crossing angle ($\alpha$) between the side portion and the outer peripheral planar portion is set at more than or equal to 45 degrees. A dropping volume of the molten glass drop is such that, when dropped onto the lower mold, a volume of the molten glass drop located above the outer peripheral planar portion is 1.5 times to 6.0 times the volume of the molten glass drop filling the recess.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2 and 3 are first and second schematic views of a manufacturing flow using an apparatus for manufacturing a glass molding.

FIG. 14 shows the number of occurrence of uneven-thickness defects in Example 1.

FIG. 16 shows the number of occurrence of uneven-thickness defects in Example 2.

FIG. 18 shows the number of occurrence of uneven-thickness defects in Example 3.

DESCRIPTION OF THE PREFERRED EMBODIMENTS

Figure 1:
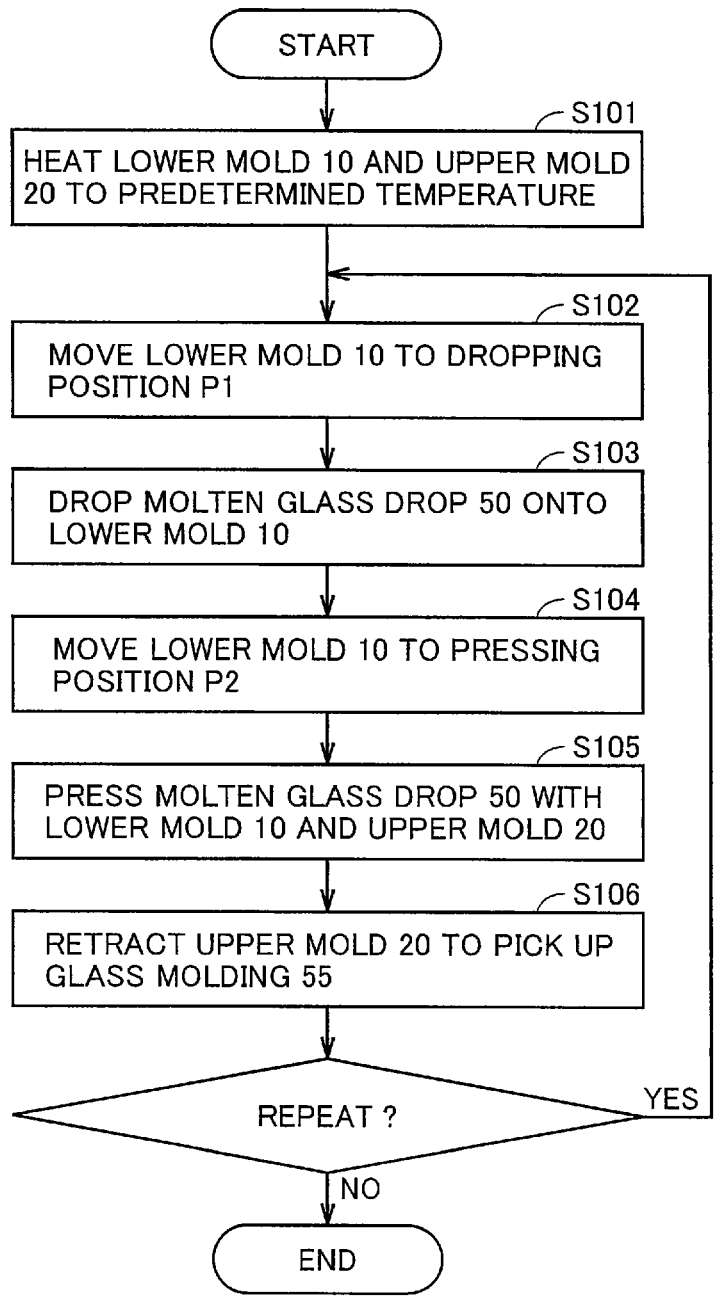
FIG. 1 is a flow chart of a method of manufacturing a glass molding.

A method of manufacturing a mold and a glass molding in an embodiment based on the present invention will be described below with reference to the drawings. It is noted that, when the number, amount and the like are mentioned in the embodiment described below, the scope of the present invention is not necessarily limited to that number, amount and the like unless otherwise specified. Identical and corresponding parts are denoted by an identical reference character, and repeated description thereof may not be repeated.

Figure 2:
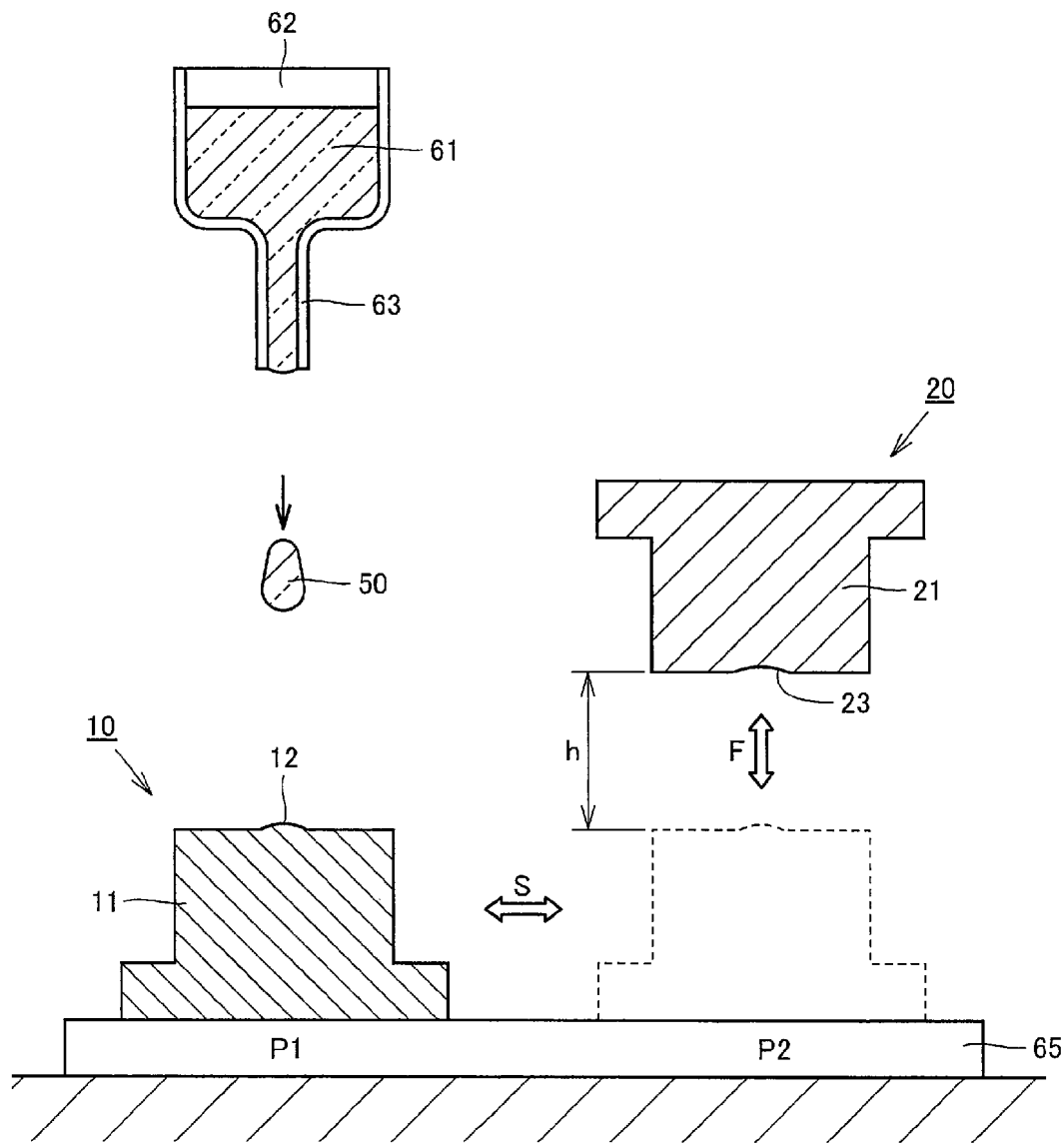

Referring to FIGS. 1 to 3, an example of a method of manufacturing a glass molding in a comparative example will now be described.

(Apparatus for Manufacturing Glass Molding)

The apparatus for manufacturing a glass molding shown in FIGS. 2 and 3 has a lower mold 10 and an upper mold 20 as a mold for pressing a molten glass drop 50. Upper mold 20 has a base 21, and a molding surface (concave surface) 23 on which molten glass drop 50 is pressed is formed in this base 21.

The material of base 21 can be implemented by selecting as appropriate from among materials publicly known as materials for a mold for press molding a glass material, depending on conditions. Materials that can be preferably used include, for example, various heat resistant alloys (stainless steel etc.), super hard materials mainly composed of tungsten carbide, various ceramics (silicon carbide, silicon nitride, etc.), composite materials containing carbon, and the like.

Lower mold 10 has a base 11, and a molding surface (convex surface) 12 on which molten glass drop 50 is pressed is formed in this base 11. The material of base 11 of lower mold 10 may be implemented by selecting as appropriate from among materials similar to those of base 21 of upper mold 20. Base 11 of lower mold 10 and base 21 of upper mold 20 may be of the same material, or may be of different materials.

Lower mold 10 and upper mold 20 are configured such that they can each be heated to a predetermined temperature by heating means not shown. The heating means can be implemented by selecting as appropriate from among publicly-known heating means. For example, such heating means include a cartridge heater embedded in lower mold 10 or upper mold 20 for use, a sheet-like heater externally brought into contact for use, an infrared heating device, a high-frequency induction heating device, and the like. It is more preferable to configure lower mold 10 and upper mold 20 such that they can be temperature-controlled independently.

Lower mold 10 is configured so as to be movable by driving means not shown along a guide 65 (in the directions of arrow S in FIGS. 2 and 3) between a position (dropping position P1) for receiving molten glass drop 50 and a position (pressing position P2) opposed to upper mold 20 to perform press molding.

Upper mold 20 is configured so as to be movable by driving means not shown in a direction in which molten glass drop 50 is pressed (in the vertical direction in FIGS. 2 and 3 (the directions of arrow F)). It is noted that, although only upper mold 20 moves in the pressing direction will be described herein by way of example, this is not a limitation, and lower mold 10 may be configured to move in the pressing direction, or both lower mold 10 and upper mold 20 may be configured to move in the pressing direction.

A dropping nozzle 63 for dropping molten glass drop 50 is arranged above dropping position P1. Dropping nozzle 63 is connected to the bottom of a melting bath 62 retaining a molten glass 61 and is configured to be heated by heating means not shown so that molten glass drop 50 drops out of the leading end.

(Method of Manufacturing Glass Molding)

Referring to the flow chart shown in FIG. 1, the respective steps will now be described sequentially. First, lower mold 10 and upper mold 20 are heated to a predetermined temperature (step S101). The predetermined temperature may be implemented by selecting as appropriate a temperature at which a favorable transfer surface (optical surface) can be formed on a glass molding by press molding. When the temperature of lower mold 10 and upper mold 20 is excessively low, a glass molding is more likely to be crimped, and the transfer surface may deteriorate in form accuracy. In contrast, when the temperature is excessively higher than necessary, welding with a glass molding is more likely to occur, which may shorten the life of lower mold 10 and upper mold 20.

Practically, it is preferable to experimentally calculate an appropriate temperature since the appropriate temperature varies depending on various conditions, such as the type, shape and size of glass, the material and size of lower mold 10 and upper mold 20, and the like. Representing a glass transition temperature of the glass used as Tg, it is commonly preferable to set the appropriate temperature at a temperature ranging from about Tg−100° C. to Tg+100° C. The heating temperature of lower mold 10 and upper mold 20 may be equal or may be different.

Then, lower mold 10 is moved to dropping position P1 (step S102), and molten glass drop 50 is dropped out of dropping nozzle 63 (step S103) (see FIG. 2). Dropping of molten glass drop 50 is performed by heating dropping nozzle 63 connected to melting bath 62 retaining molten glass 61 to a predetermined temperature. When dropping nozzle 63 is heated to the predetermined temperature, molten glass 61 retained in melting bath 62 is supplied under its own weight to the leading end of dropping nozzle 63 to be accumulated dropwise by surface tension. When the molten glass accumulated at the leading end of dropping nozzle 63 reaches a certain mass, the molten glass is separated automatically from dropping nozzle 63 by gravity, and drops as molten glass drop 50.

The mass of molten glass drop 50 dropped out of dropping nozzle 63 can be adjusted by the outer diameter of the leading end of dropping nozzle 63 or the like, so that a molten glass drop of about 0.1 g to 2 g can be dropped depending on the type of glass or the like. Alternatively, molten glass drop 50 dropped out of dropping nozzle 63 may be caused to temporarily impinge on a member having a through hole (about φ 2.0 mm to φ 4.0 mm) (a glass miniaturizing member not shown), and then part of the impinged molten glass drop is caused to pass through the through hole, so that a miniaturized molten glass drop may be dropped onto lower mold 10.

Since a minute molten glass drop of, for example, 0.001 g can be obtained through use of such a method, a more minute glass gob can be produced than in the case where molten glass drop 50 dropped out of dropping nozzle 63 is directly received by lower mold 10. It is noted that the interval at which molten glass drop 50 is dropped out of dropping nozzle 63 can be finely adjusted by the inner diameter, length, heating temperature of dropping nozzle 63, and the like.

The type of glass that can be used is not particularly limited, and can be implemented by selecting from among publicly-known glasses depending on application. Such glasses include optical glasses, such as, for example, borosilicate glass, silicate glass, phosphate glass, and lanthanum-based glass.

Then, lower mold 10 is moved to pressing position P2 (step S104), and upper mold 20 is moved downward, so that molten glass drop 50 is press molded with lower mold 10 and upper mold 20 (step S105) (see FIG. 3). Molten glass drop 50 received by lower mold 10 is cooled by heat dissipation from contact surfaces with lower mold 10 and upper mold 20 during press molding, to be solidified into a glass molding 55.

When glass molding 55 is cooled to a predetermined temperature, upper mold 20 is moved upward to release compression. It is commonly preferable to release compression after cooling to a temperature near Tg of glass depending on the type of glass, the size and shape of glass molding 55, required precision, and the like.

Load to be applied to press molten glass drop 50 may always remain constant, or may be varied with time. The magnitude of load to be applied may be set as appropriate depending on the size of a glass molding to be manufactured and the like. The driving means for moving upper mold 20 up and down is not particularly limited, but can be implemented as appropriate by selecting from among publicly-known driving means, such as an air cylinder, an oil hydraulic cylinder, and an electrically-driven cylinder using a servo-motor.

Thereafter, upper mold 20 is moved upward to retract, and solidified glass molding 55 is picked up (step S106), so that manufacture of a glass molding is completed. When manufacture of another glass molding follows, lower mold 10 may be moved again to dropping position P1 (step S102) to repeat the subsequent steps.

It is noted that the method of manufacturing a glass molding may include other steps than those described herein. For example, the method may include the steps of inspecting the shape of a glass molding before picking up the glass molding, cleaning lower mold 10 and upper mold 20 after picking up the glass molding, and the like.

The glass molding manufactured by this manufacturing method can be used as various optical elements, such as an image pickup lens for digital camera or the like, an optical pickup lens for DVD or the like, and a coupling lens for optical communications. Alternatively, it can also be used as a glass preform for use in manufacturing various optical elements by the reheat press method.

(Lower Mold for Molding in Comparative Example)

Figure 4:
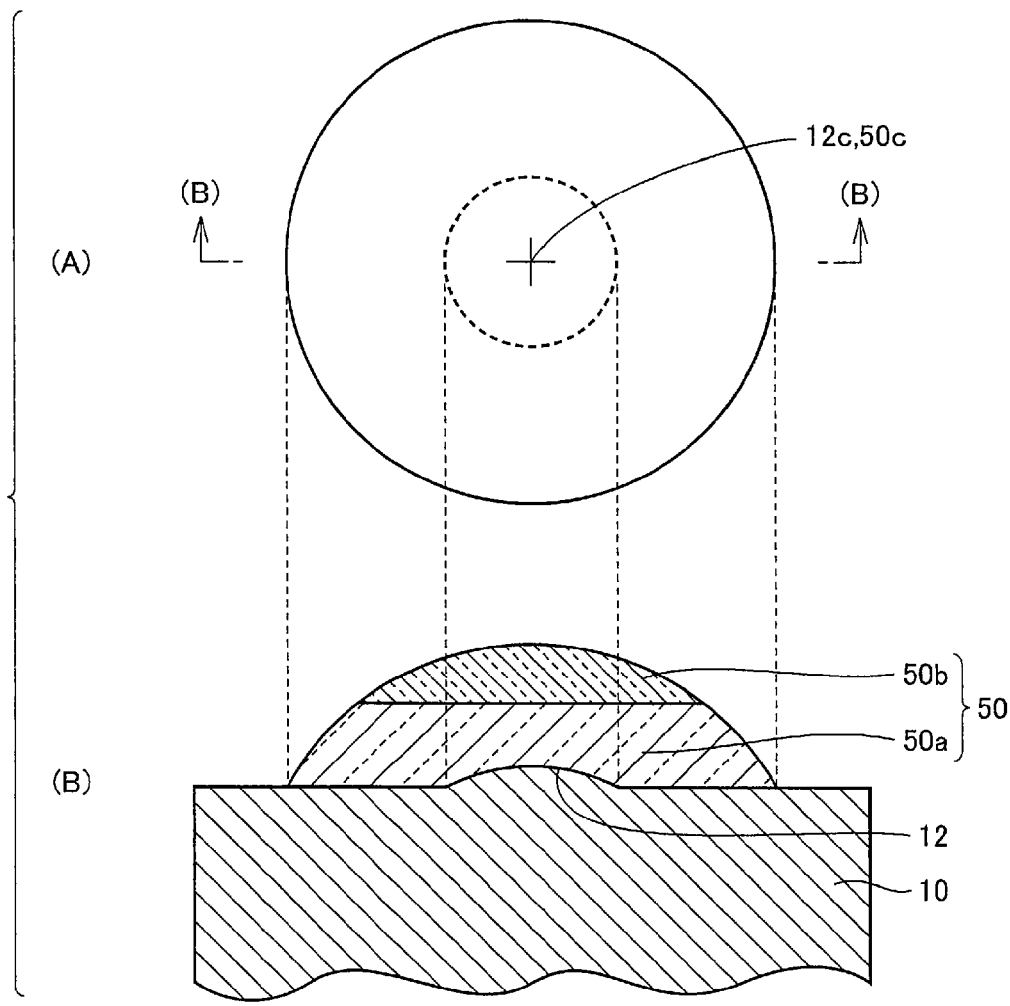
FIG. 4 is a first diagram showing a method of manufacturing a glass molding using a mold in a comparative example, including a plan view at (A) and a sectional view at (B) viewed along the line (B)-(B) at (A).
Figure 5:
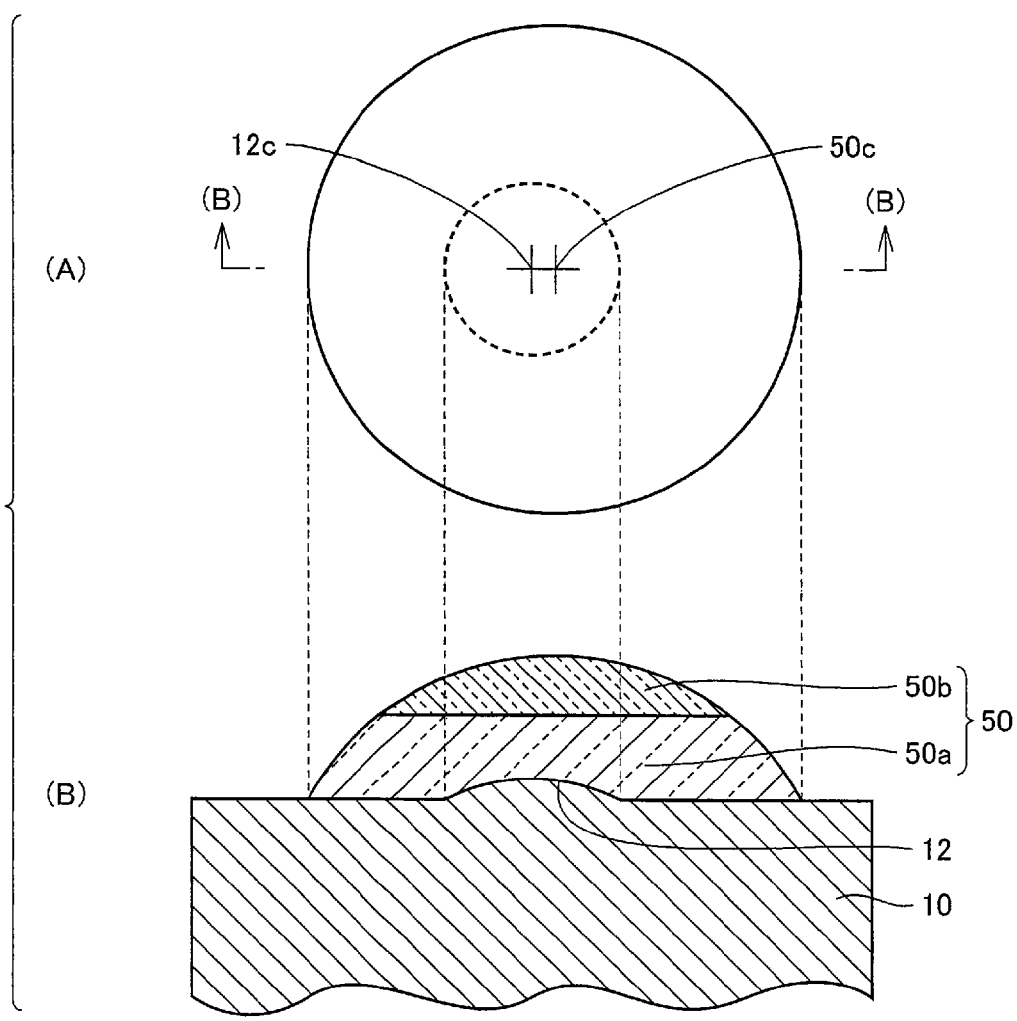
FIG. 5 is a second diagram showing the method of manufacturing a glass molding using a mold in a comparative example, including a plan view at (A) and a sectional view at (B) viewed along the line (B)-(B) at (A).

Referring to FIGS. 4 and 5, a method of manufacturing a glass molding when lower mold 10 in a comparative example is used will now be described.

FIG. 4 shows the state where a central position 12c of a convex molding surface 12 of lower mold 10 and a central position 50c of molten glass drop 50 dropped out of dropping nozzle 63 coincide with each other. FIG. 4, at (B), shows the temperature distribution of molten glass drop 50 after the lapse of a certain period of time, and a region 50a closer to lower mold 10 represents a region which has been heat dissipated by lower mold 10 to reach a low temperature state. A region 50b distant from lower mold 10 represents a region which is less heat dissipated by lower mold 10 to remain in a high temperature state.

When dropped molten glass drop 50 is pressed with lower mold 10 and upper mold 20 with central position 12c of molding surface 12 and central position 50c of molten glass drop 50 coinciding with each other, glass molding 55 having favorable precision can be obtained.

FIG. 5 shows the state where central position 12c of convex molding surface 12 of lower mold 10 and central position 50c of molten glass drop 50 dropped out of dropping nozzle 63 are displaced from each other. FIG. 5, at (B), shows the temperature distribution of molten glass drop 50 after the lapse of a certain period of time, and region 50a closer to lower mold 10 represents a region which has been heat dissipated by lower mold 10 to reach a low temperature state. Region 50b distant from lower mold 10 represents a region which is less heat dissipated by lower mold 10 to remain in a high temperature state.

When dropped molten glass drop 50 is pressed with lower mold 10 and upper mold 20 with central position 12c of molding surface 12 and central position 50c of molten glass drop 50 being displaced from each other, molten glass drop 50 is pressed with upper mold 20 since region 50a is already in a low temperature state. As a result, resultant glass molding 55 contains a wavefront aberration defect and an outer shape defect due to the displacement.

(Embodiment)

Figure 6:
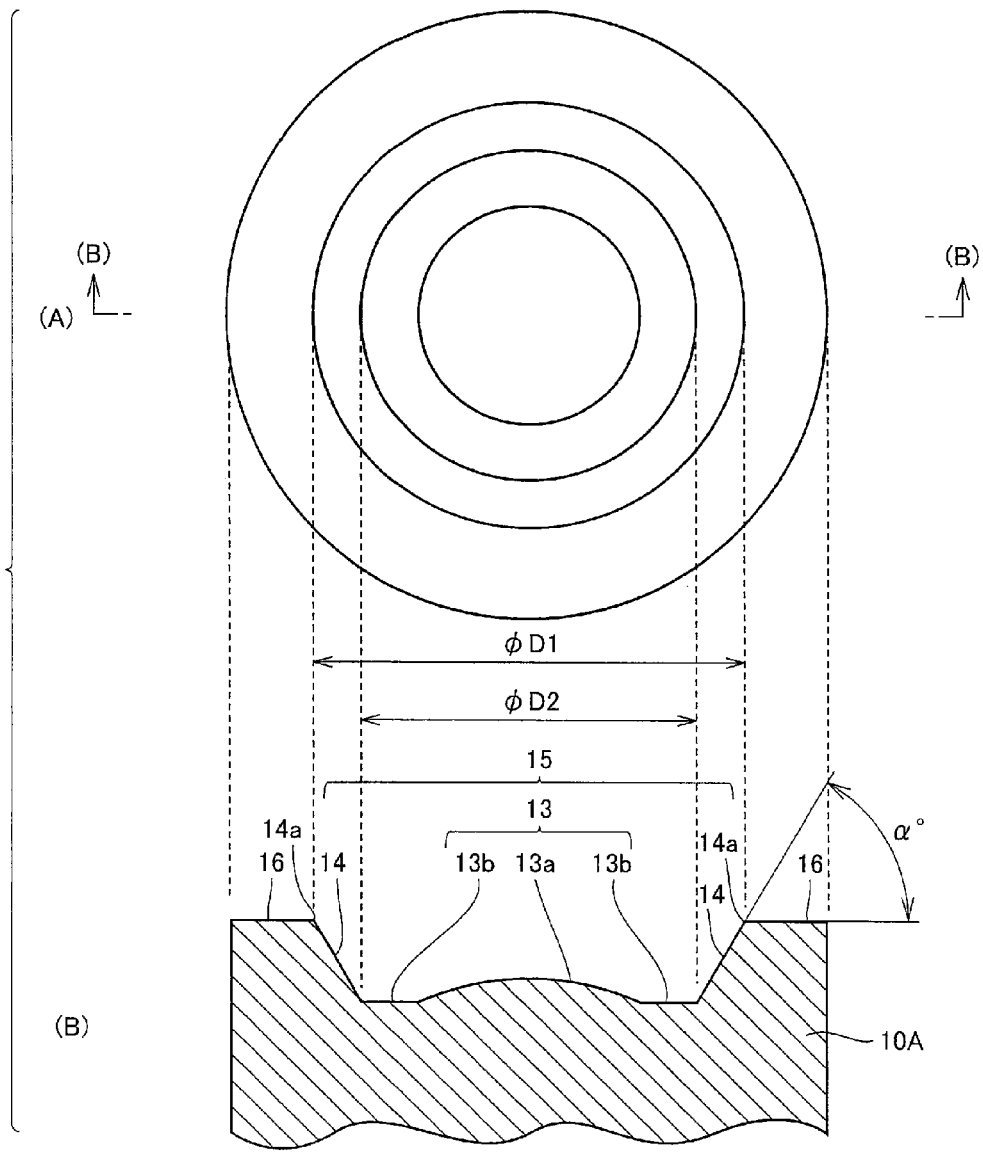
FIG. 6 shows a structure of a lower mold of a mold in an embodiment, including a plan view at (A) and a sectional view at (B) viewed along the line (B)-(B) at (A).
Figure 7:
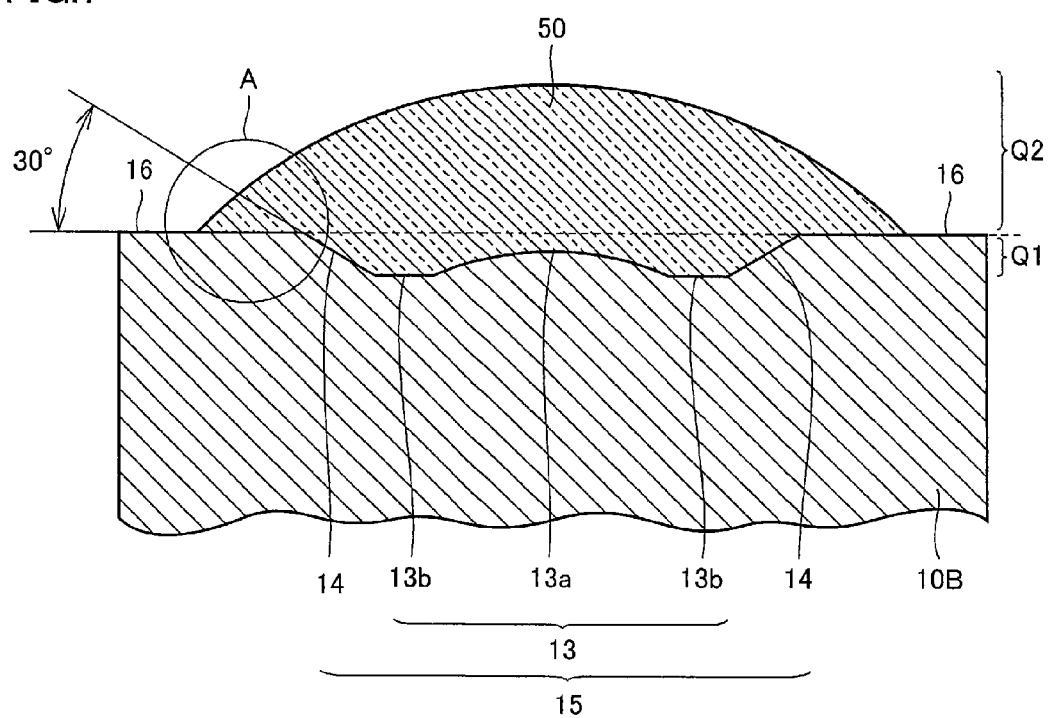
FIG. 7 is a sectional view of a molten glass drop and a lower mold when a problem occurs in a comparative example.
Figure 8:
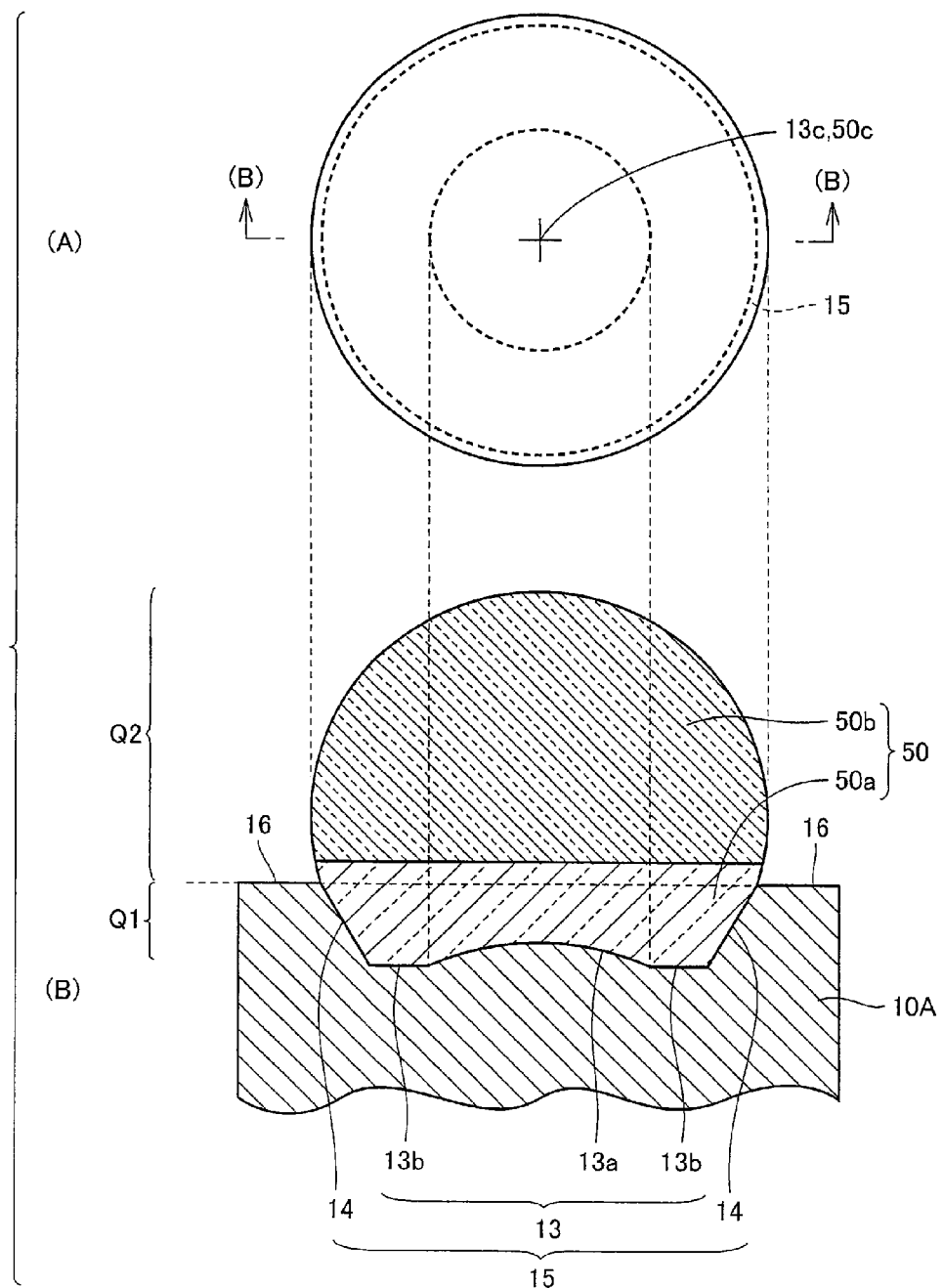
FIG. 8 is a sectional view of a molten glass drop and a lower mold in the present embodiment without drop displacement with respect to dropping conditions and with an appropriate dropping volume.

Referring to FIGS. 6 to 8, a method of manufacturing a glass molding when a lower mold 10A in a present embodiment is used will now be described.

First, referring to FIGS. 6 (A) and (B), the shape of lower mold 10A in the present embodiment will be described. This lower mold 10A has a circular bottom portion 13 and a side portion 14 that surrounds this bottom portion 13, and includes a recess 15 for molding therein an optical surface including an effective diameter of a lens of a glass molding to be molded, and an outer peripheral planar portion 16 that surrounds an upper end 14a of side portion 14.

Bottom portion 13 has a circular convex portion 13a and an annular inner peripheral planar portion 13b that surrounds this convex portion 13a. This circular convex portion 13a serves as a region where an optical surface is molded for the glass molding.

A crossing angle (α) between outer peripheral planar portion 16 and side portion 14 is set at more than or equal to 45 degrees. A more specific crossing angle (α) will be described in an embodiment below. It is noted that, in the case of less than or equal to 45 degrees, for example, in the case of a lower mold 10B whose crossing angle (α) between outer peripheral planar portion 16 and side portion 14 is 30 degrees as shown in FIG. 7, when molten glass drop 50 overflows recess 15, it is envisaged that molten glass drop 50 flows onto the surface of outer peripheral planar portion 16 (an encircled region A in FIG. 7) without being rounded. Therefore, the crossing angle (α) between outer peripheral planar portion 16 and side portion 14 is preferably set at more than or equal to 45 degrees (and less than or equal to 90 degrees).

Reference is now made to FIG. 8 showing the state where an optimum amount of molten glass drop 50 has been dropped onto lower mold 10A. In the present embodiment, molten glass drop 50 is dropped onto lower mold 10A such that a volume (Q2) of molten glass drop 50 located above outer peripheral planar portion 16 is 1.5 times to 6.0 times the volume (Q1) of the molten glass drop that fills recess 15, and molten glass drop 50 is press molded with lower mold 10A and upper mold 20.

In this case, since region 50b distant from lower mold 10A is less heat dissipated by lower mold 10 to remain in a high temperature state while region 50a closer to lower mold 10A is heat dissipated by lower mold 10A to reach a low temperature state, region 50b remaining in a high temperature state is rounded with centripetal force generated by surface tension of the molten glass drop 50, allowing a central position 13c of convex portion 13a and central position 50c of molten glass drop 50 to coincide with each other.

As a result, when dropped molten glass drop 50 is pressed with lower mold 10 and upper mold 20 with central position 13c of convex portion 13a and central position 50c of molten glass drop 50 coinciding with each other, glass molding 55 with favorable precision can be obtained.

Figure 9:
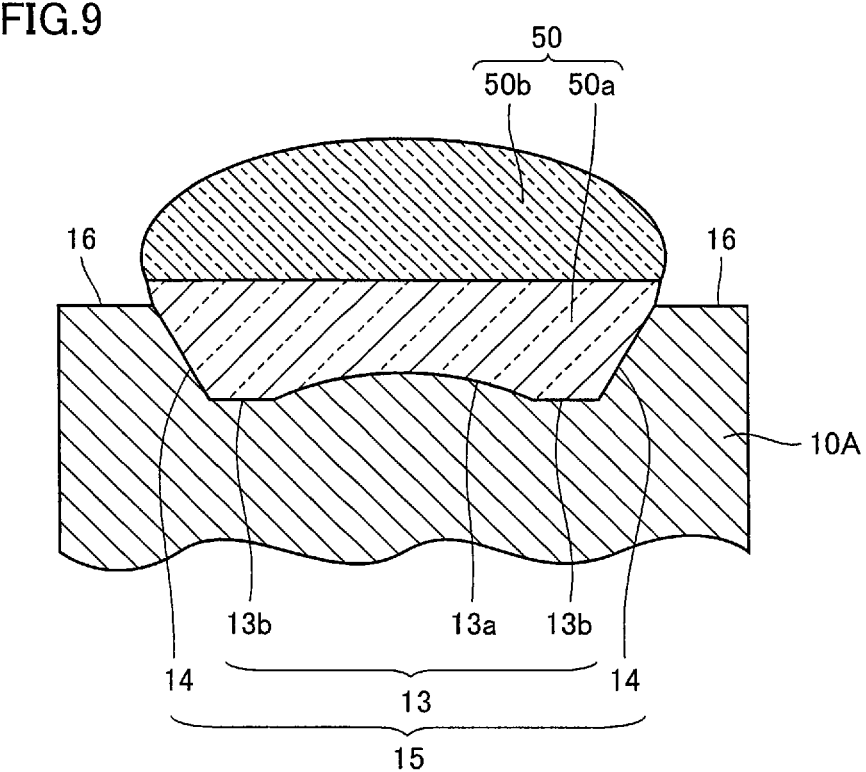
FIG. 9 is a first sectional view of a molten glass drop and a lower mold when a problem occurs in a comparative example.
Figure 10:
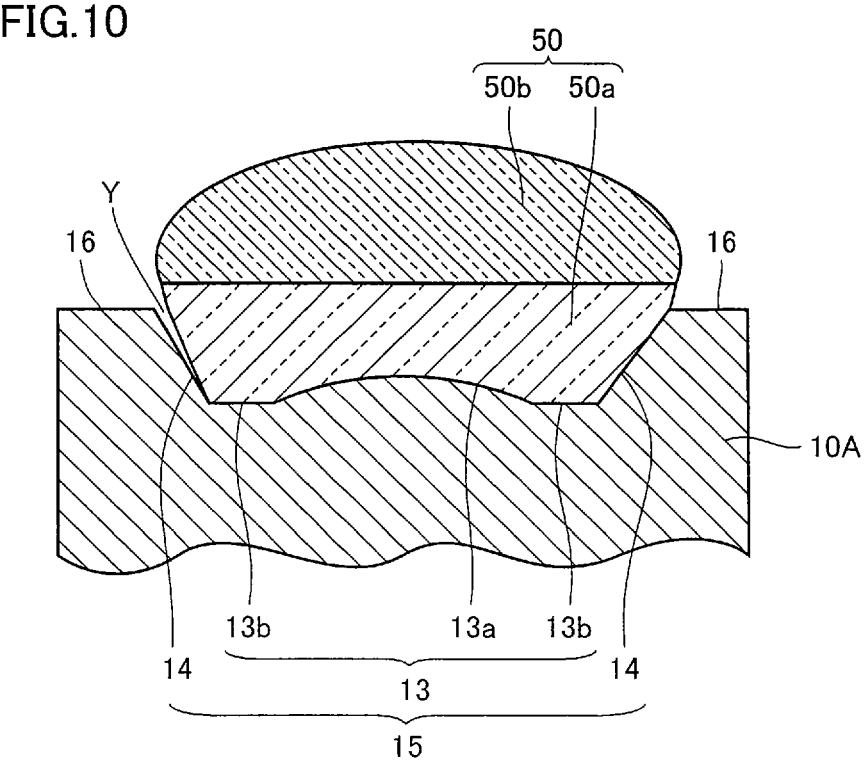
FIG. 10 is a second sectional view of a molten glass drop and a lower mold when a problem occurs in a comparative example.

FIGS. 9 and 10 are schematic views in the case where the volume of molten glass drop 50 located above outer peripheral planar portion 16 is less than 1.5 times the volume of the molten glass drop that fills recess 15. FIG. 9 shows the state where central position 13c of convex portion 13a and central position 50c of molten glass drop 50 coincide with each other. No problem arises when the central positions coincide with each other.

On the other hand, a problem arises when central position 13c of convex portion 13a and central position 50c of molten glass drop 50 do not coincide with each other. FIG. 10 shows the state where a drop displacement occurs to the right in the figure (in other words, the state where central position 50c of molten glass drop 50 is located to the right in the figure relative to central position 13c of convex portion 13a). In this case, a problem arises in that a clearance at side portion 14 (at Y in the figure) is not filled with glass due to the molten glass drop not having a sufficiently large weight. In this state, region 50b in a high temperature state can be rounded with centripetal force by surface tension, however, its central position will be displaced to the right in the figure.

When dropped molten glass drop 50 in such a state is pressed with lower mold 10A and upper mold 20, glass molding 55 with favorable precision cannot be obtained.

Figure 11:
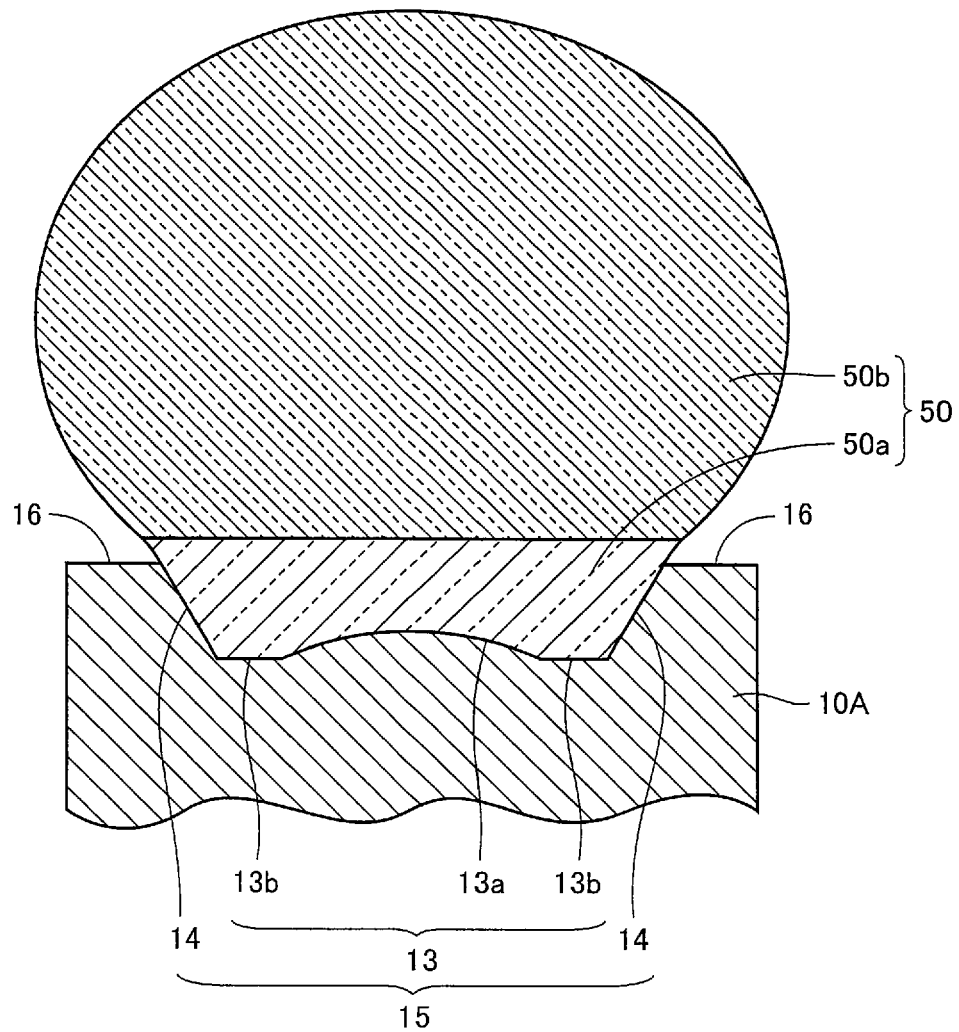
FIG. 11 is a third sectional view of a molten glass drop and a lower mold when a problem occurs in a comparative example.
Figure 12:
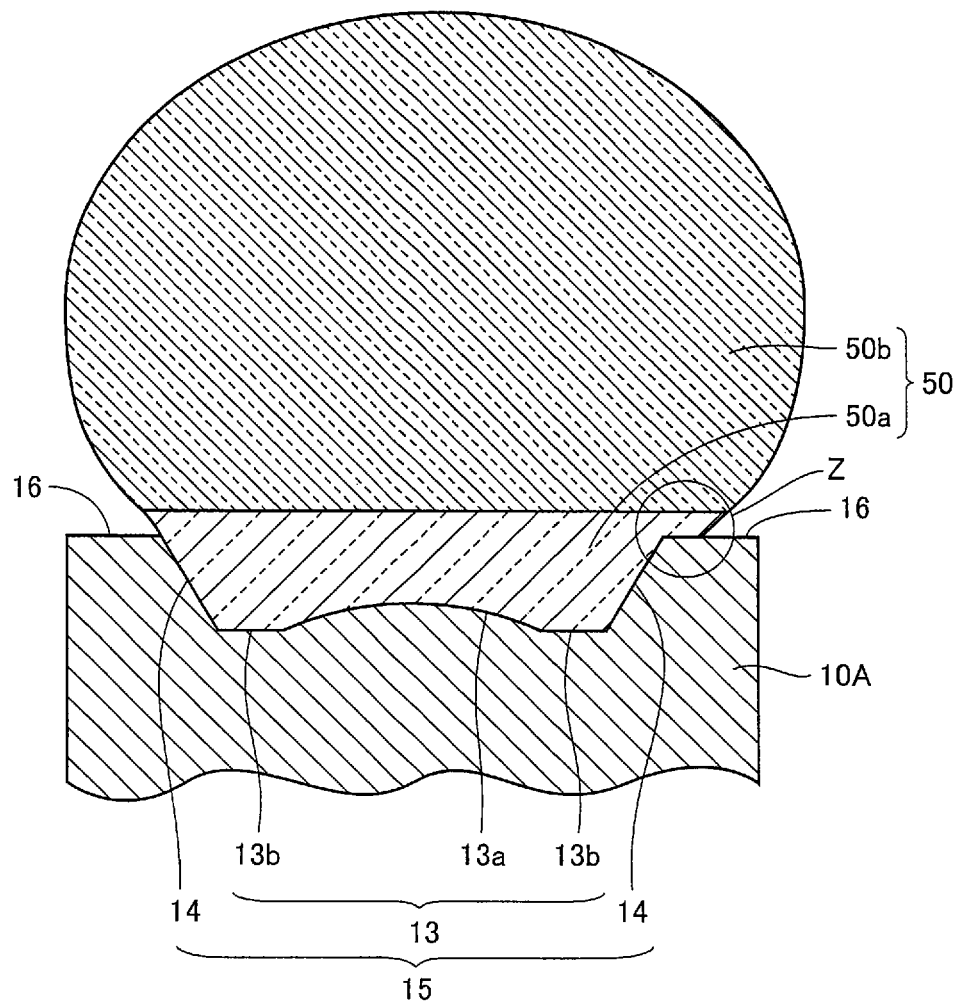
FIG. 12 is a fourth sectional view of a molten glass drop and a lower mold when a problem occurs in a comparative example.

FIGS. 11 and 12 are schematic views in case where the volume of molten glass drop 50 located above outer peripheral planar portion 16 exceeds 6.0 times the volume of the molten glass drop that fills recess 15. FIG. 11 shows the state where central position 13c of convex portion 13a and central position 50c of molten glass drop 50 coincide with each other. No problem arises when the central positions coincide with each other.

On the other hand, a problem arises when central position 13c of convex portion 13a and central position 50c of molten glass drop 50 do not coincide with each other. FIG. 12 shows the state where a drop displacement occurs to the right in the figure (in other words, the state where central position 50c of molten glass drop 50 is located to the right in the figure relative to central position 13c of convex portion 13a). In this case, part of the molten glass drop in region 50b closer to lower mold 10A is in very close contact with planar portion 16 until being rounded by surface tension immediately after dropping (in an appropriate case (shown in FIG. 8), it does not come into close contact relatively).

Therefore, when a drop displacement occurs, part of the molten glass drop in region 50b closer to lower mold 10A comes into contact with planar portion 16, and that part in contact is cooled to become region 50a, and is immobilized. Then, region 50b still having heat sufficient for being rounded by surface tension is rounded by surface tension while being slightly displaced in the overflowing direction Z (the state shown in FIG. 12).

When dropped molten glass drop 50 in such a state is pressed with lower mold 10A and upper mold 20, glass molding 55 with favorable precision cannot be obtained.

(Function and Effect)

According to the method of manufacturing a glass molding when lower mold 10A in the present embodiment is used, although the contact surface between molten glass drop 50 and lower mold 10A is cooled and solidified immediately after dropping, centripetal force based on surface tension acts on molten glass drop 50 located above outer peripheral planar portion 16 by optimizing the crossing angle (α) between outer peripheral planar portion 16 and side portion 14 as well as the volume of molten glass drop 50 located above outer peripheral planar portion 16, so that molten glass drop 50 located above outer peripheral planar portion 16 can be rounded into a free-form surface by surface tension.

As a result, even if a displacement at a level of 0.3 mm occurs when molten glass drop 50 is dropped, for example, it is possible to make central position 13c of convex portion 13a and central position 50c of molten glass drop 50 coincide with each other. In addition, when dropped molten glass drop 50 is pressed with lower mold 10A and upper mold 20 in this state, glass molding 55 with favorable precision can be obtained. This can reduce a wavefront aberration defect and an outer shape defect of glass molding 55.

As a result, it is possible to provide a method of manufacturing a glass molding capable of obtaining further improved precision of the glass molding even when glass molding 55 is miniaturized.

EXAMPLE

Specific examples in the present embodiment will now be described with reference to the drawings. First, referring to FIG. 13, preconditions for the respective examples will be described.

Figure 13:
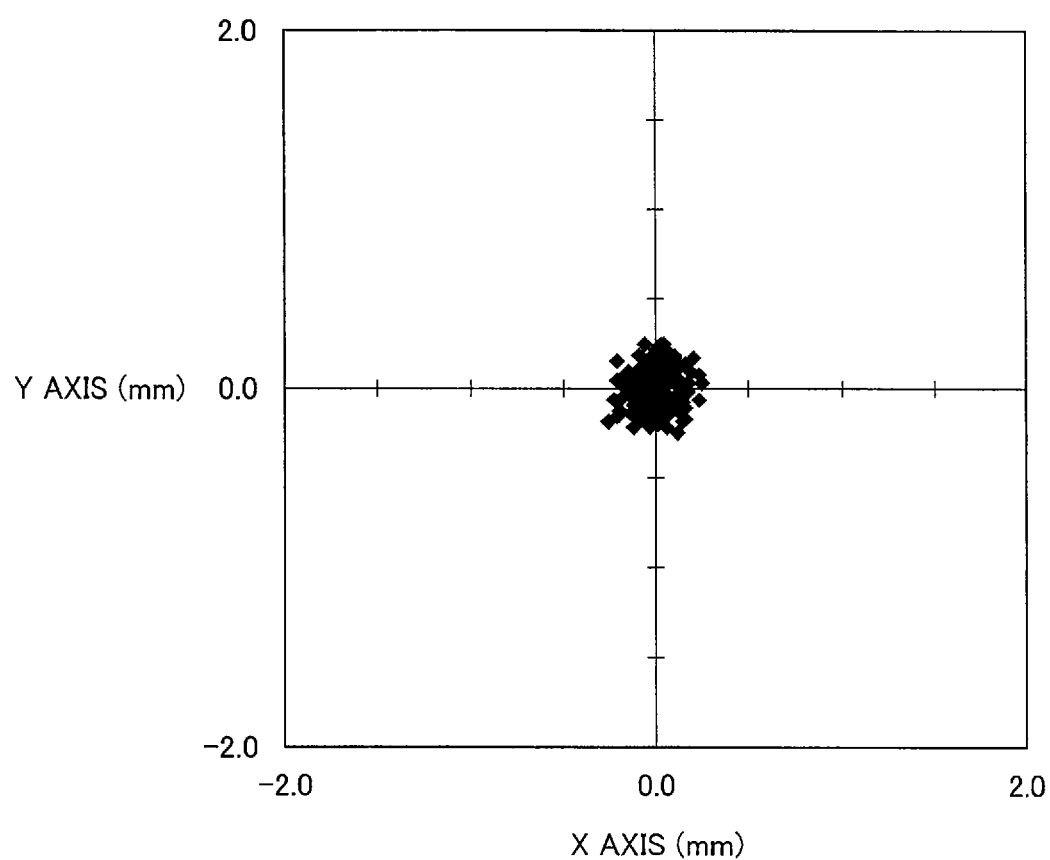
FIG. 13 shows the result of measurements of drop displacements in an apparatus for manufacturing a glass molding.

In the apparatus for manufacturing a glass molding shown in FIGS. 2 and 3, the distance from the leading end of the dropping nozzle to the lower mold (the outer peripheral planar portion) was about 1000 mm. Drop displacements were at a level falling within a circle with a diameter of about 0.5 mm. The result of measurements is shown in FIG. 13. Based on this result, verification was performed for the cases where drop displacements were up to 0.3 mm. The opening diameter (diameter) of the recess of the lower mold was set at about 3 mm to 6 mm, and drop displacements 0.05 time to 0.1 time the opening diameter were created.

The method of creating the drop displacements in this verification quantitatively is as follows. A molten glass drop measured to be approximately at the central position of drop distribution by a laser displacement meter with the lower mold displaced by a predetermined distance from the central position of drop distribution was adopted. Upon press molding the molten glass drop with the lower mold and the upper mold, quality determination was made depending on whether or not uneven thickness occurred in a glass molding. Determination as to whether or not uneven thickness occurred in the glass molding was determined to be effective for estimating the temperature distribution that was unknown merely from the shape of a molten glass drop.

More specifically, when molten glass drop 50 is pressed with lower mold 10A and upper mold 20, a molded product will have a shape extending in the direction in which molten glass drop 50 is higher in temperature. For example, in the example shown in FIG. 10, a molded product after pressing will have a shape extending to the left since the left side of the molten glass drop in the figure out of contact with the mold is higher in temperature because of the presence of clearance Y. In the example shown in FIG. 12, a molded product after pressing will have a shape extending to the left where the molten glass drop is higher in temperature since the right side of glass in the figure in contact with planar portion 16 has been cooled. It is noted that a glass molding after pressing will assume a concentric circular shape in the state where no influence is exerted by a drop displacement, in other words, where the molten glass drop has no temperature variations.

The material of glass was implemented by a phosphoric acid-based glass having a glass transition temperature (Tg) of 427° C. Specific gravity was 3.20. The lower mold had a temperature of 480° C., and the upper mold had a temperature of 500° C. The bases of the lower mold and the upper mold were implemented by a super hard material (WC), and protective films (Cr 500 nm) were provided on the molding surfaces.

Example 1

Verifications were conducted for the number of occurrence of uneven-thickness defects depending on the ratio (Q2/Q1) between the volume (Q1) of the molten glass drop that fills the recess and an overflowing mass (the volume (Q2) of the molten glass drop located above the outer peripheral planar portion) assuming the whole mass of the molten glass drop to be constant (250 mg). The dropping nozzle was implemented by a dropping nozzle made of platinum having an outer diameter of φ 6 mm. The distance from the leading end of the dropping nozzle to the lower mold (the outer peripheral planar portion) was about 1000 mm.

Figure 15:
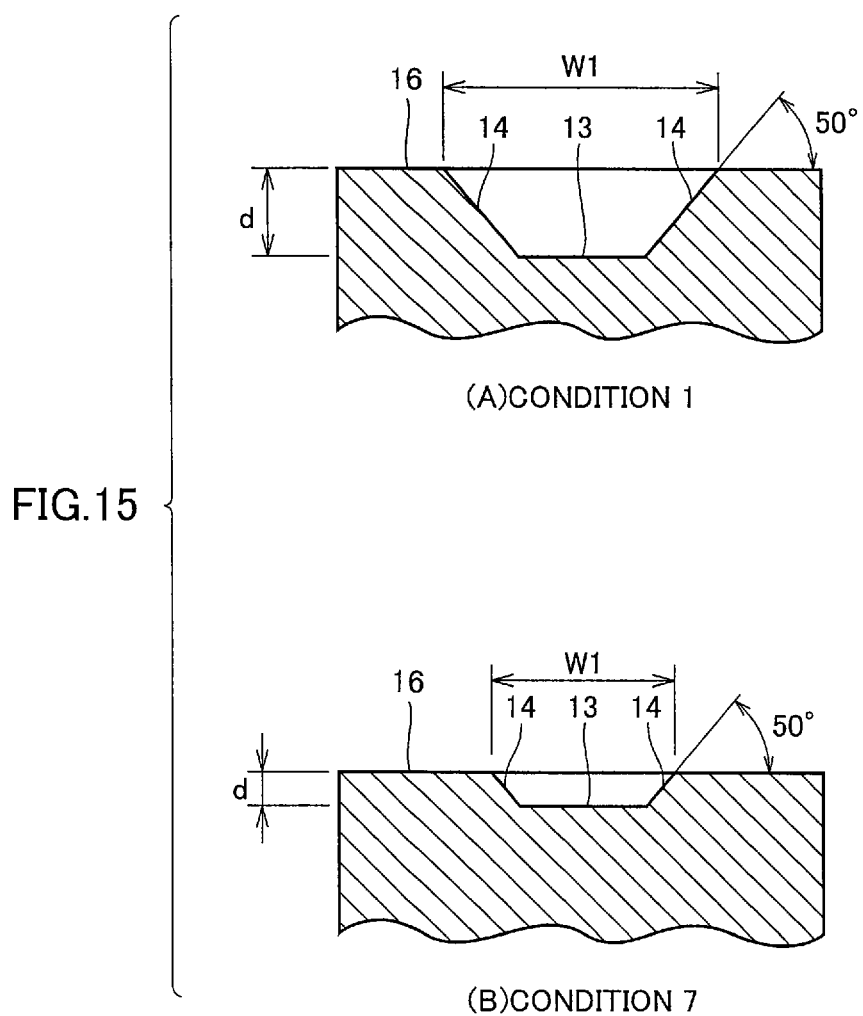
FIG. 15 shows an angle ($\alpha$) formed by an outer peripheral planar portion and a side portion under each of (A) Condition 1 and (B) Condition 7 in Example 1.

FIG. 14 shows the number of occurrence of uneven-thickness defects in Example 1, and FIG. 15 shows, at (A) and (B), schematic views of the shape of lower mold used under Condition 1 and Condition 7 in FIG. 14 (Conditions 2 to 6 were similar in shape, but differed in recess depth d and recess opening diameter W1 from one another). Herein, the crossing angle (α) between side portion 14 and outer peripheral planar portion 16 was set at 50°. The recess depth d (mm) and recess opening diameter W1 (mm) in FIG. 15 were as shown in the table of FIG. 14.

At the ratio (Q2/Q1) indicated by Conditions 1 to 7 shown in FIG. 14, the number of occurrence of uneven-thickness defects was measured. The result shown in FIG. 14 could reveal that there were few number of occurrence of uneven-thickness defects under Condition 3 at the ratio (Q2/Q1) of 1.50, Condition 4 at the ratio (Q2/Q1) of 4.00, and Condition 5 at the ratio (Q2/Q1) of 6.00.

Example 2

Verifications were conducted for the number of occurrence of uneven-thickness defects depending on the ratio (Q2/Q1) between the volume (Q1) of the molten glass drop filling the recess and an overflowing mass (the volume (Q2) of the molten glass drop located above the outer peripheral planar portion) assuming the volume (Q1) in the recess of the lower mold to be constant (20 mg). The dropping nozzle was implemented by a dropping nozzle made of platinum having an outer diameter of φ 8 mm. A glass miniaturizing member having a through hole (about φ 2.0 mm to φ 3.0 mm) was arranged between the dropping nozzle and the lower mold. The distance from the leading end of the dropping nozzle to the glass miniaturizing member was about 900 mm. The distance from the glass miniaturizing member to the lower mold (the outer peripheral planar portion) was about 100 mm. It is noted that the entire mass of the molten glass drop dropped out of the dropping nozzle was 385 mg.

Figure 17:
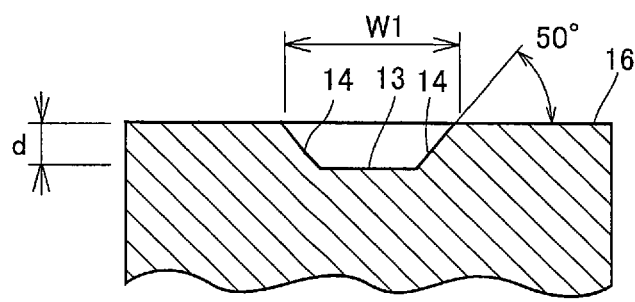
FIG. 17 shows a crossing angle ($\alpha$) formed by an outer peripheral planar portion and a side portion of a lower mold in Example 2.

FIG. 16 shows the number of occurrence of uneven-thickness defects in Example 2, and FIG. 17 is a schematic view of the shape of the lower mold used under Conditions 1 to 7 in FIG. 16. Herein, the crossing angle (α) between side portion 14 and outer peripheral planar portion 16 was set at 50°. The recess depth d (mm) and recess opening diameter W1 (mm) in FIG. 17 were as shown in the table of FIG. 16. The bottom diameter (W2) of the recess was 2 mm.

At the ratio (Q2/Q1) indicated by Conditions 1 to 7 shown in FIG. 16, the number of occurrence of uneven-thickness defects was measured. The result shown in FIG. 16 could reveal that there were few number of occurrence of uneven-thickness defects under Condition 3 at the ratio (Q2/Q 1) of 1.50, Condition 4 at the ratio (Q2/Q1) of 4.00, and Condition 5 at the ratio (Q2/Q1) of 6.00.

Example 3

Verifications were conducted for the number of occurrence of uneven-thickness defects depending on the difference in crossing angle (α) between the side portion and the outer peripheral planar portion of the lower mold. The dropping nozzle was implemented by a dropping nozzle made of platinum having an outer diameter of φ 8 mm. A glass miniaturizing member having a through hole (about φ 3.7 mm) was arranged between the dropping nozzle and the lower mold. The distance from the leading end of the dropping nozzle to the glass miniaturizing member was about 900 mm. The distance from the glass miniaturizing member to the lower mold (the outer peripheral planar portion) was about 100 mm. It is noted that the entire mass of the molten glass drop dropped out of the dropping nozzle was 385 mg.

Figure 19A:
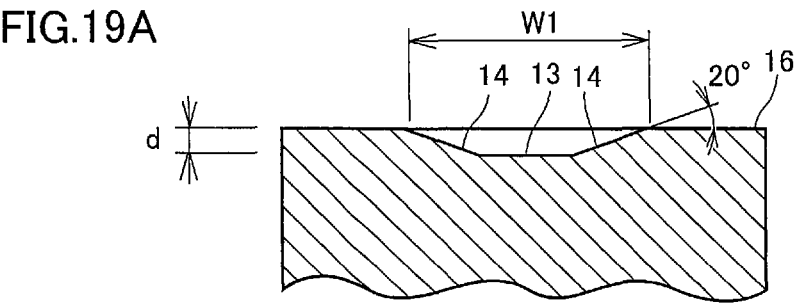
FIGS. 19A to 19D show the angle ($\alpha$) formed by an outer peripheral planar portion and a side portion of a lower mold in Example 3.
Figure 19B:
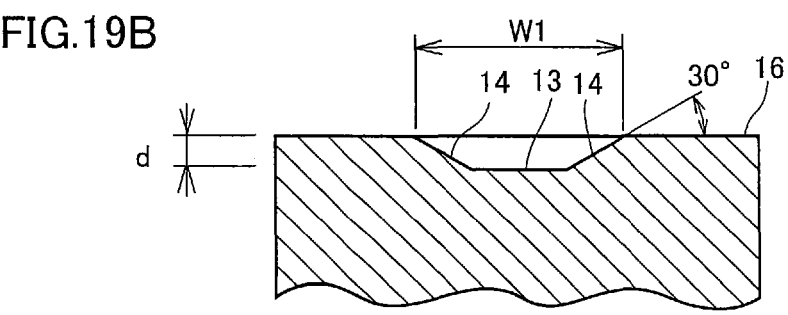
Figure 19C:
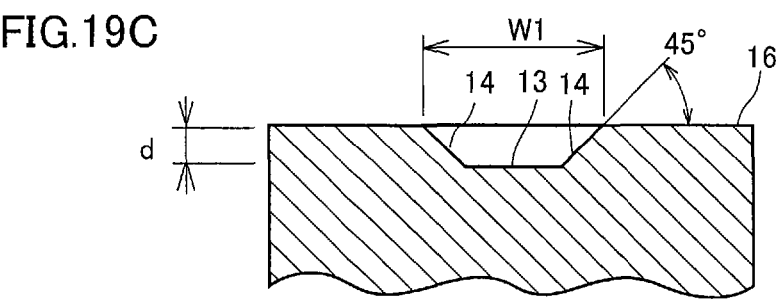
Figure 19D:
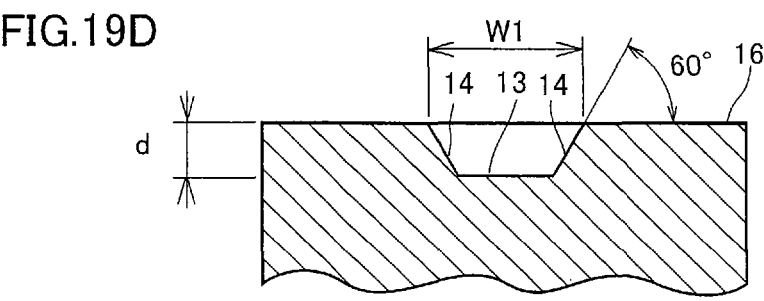

FIG. 18 shows the number of occurrence of uneven-thickness defects in Example 3. FIGS. 19A to 19D are schematic views of the shape of the lower molds used under Conditions 1 to 4 in FIG. 18. FIG. 19A shows the shape of the lower mold when the crossing angle (α) between side portion 14 and outer peripheral planar portion 16 was 20°. FIG. 19 B shows the shape of the lower mold when the crossing angle (α) between side portion 14 and outer peripheral planar portion 16 was 30°. FIG. 19C shows the shape of the lower mold when the crossing angle (α) between side portion 14 and outer peripheral planar portion 16 was 45°. FIG. 19D shows the shape of the lower mold when the crossing angle (α) between side portion 14 and outer peripheral planar portion 16 was 60°.

The recess depth d (mm) and recess opening diameter W1 (mm) in FIGS. 19A to 19D were as shown in the table of FIG. 18. The bottom diameter (W2) of the recess was 2 mm.

The number of occurrence of uneven-thickness defects was measured for Conditions 1 to 4 of the crossing angle (α) between side portion 14 and outer peripheral planar portion 16 indicated by Conditions 1 to 4 shown in FIG. 18. The result shown in FIG. 18 could reveal that uneven-thickness defects did not occur when the crossing angle (α) between side portion 14 and outer peripheral planar portion 16 was 45° (Condition 3) and 60° (Condition 4).

Figure 20:
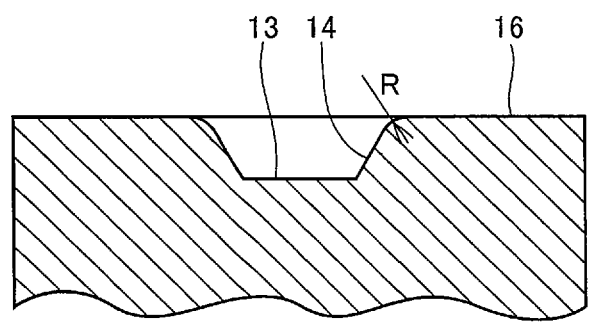
FIG. 20 is a sectional view showing the shape of a lower mold in another embodiment.

As shown in FIG. 20, in a lower mold, an upper end region where outer peripheral planar portion 16 and side portion 14 cross each other is preferably provided with a curved surface having a radius of 0.1 mm to 0.3 mm. This reduces a contact surface with the molten glass drop in recess 15, allowing molten glass drop 50 located above outer peripheral planar portion 16 to increase in centripetal force. It is noted that FIG. 20 is a sectional view showing the shape of a lower mold in another embodiment.

It is noted that the above-described embodiment shows the case where the lower mold has convex portion 13a formed at bottom portion 13 of recess 15, however, the lower mold is not limited to this, but a form with a concave portion being provided for bottom portion 13 or a form with bottom portion 13 being flat may be adopted.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a glass molding having an optical surface, the method comprising:
using a lower mold and an upper mold,
dropping a molten glass drop onto said lower mold, and
press molding said molten glass drop with said lower mold and said upper mold, said lower mold comprising:
a recess comprising a bottom portion and a side portion surrounding said bottom portion, wherein at least a portion of said bottom portion is configured to form an optical surface, and
an outer peripheral planar portion surrounding an upper end of said side portion, a crossing angle between said side portion and said outer peripheral planar portion being set at more than or equal to 45 degrees, and
wherein a first part of said molten glass drop fills said recess and a second part of said molten glass drop is located above said outer peripheral planar portion, and wherein a dropping volume of said molten glass drop being such that, when dropped onto said lower mold, a volume of said second part of said molten glass drop is 4.0 times to 6.0 times a volume of said first part of said molten glass drop so that said second part of said molten glass drop is rounded with centripetal force generated by surface tension of said molten glass drop acting on said first part of said molten glass drop.

2. The method of manufacturing a glass molding having an optical surface according to claim 1, wherein said bottom portion has a convex portion and an annular inner peripheral planar portion surrounding said convex portion.

3. The method of manufacturing a glass molding having an optical surface according to claim 1, wherein, in said lower mold, an upper end region where said outer peripheral planar portion and said side portion cross each other is provided with a curved surface having a radius of 0.1 mm to 0.3 mm.

4. The method of manufacturing a glass molding having an optical surface according to claim 1, wherein said glass molding is a glass lens.

5. The method of manufacturing a glass molding having an optical surface according to claim 1, wherein said crossing angle between said side portion and said outer peripheral planar portion ranges from 45 degrees to 60 degrees.

6. The method of manufacturing a glass molding having an optical surface according to claim 1, wherein a central position of said molten glass dropped onto said lower mold coincides with a central position of said bottom portion.

7. The method of manufacturing a glass molding having an optical surface according to claim 1, wherein said dropping comprises dropping said molten glass toward a position displaced from a central position of said bottom portion by an amount ranging from 0.10 to 0.30 mm.

8. The method of manufacturing a glass molding having an optical surface according to claim 1, wherein said recess is centered about a central portion of said lower mold.

9. The method of manufacturing a glass molding having an optical surface according to claim 1, wherein a portion of said bottom portion is parallel to a plane containing said outer peripheral planar portion.

10. The method of manufacturing a glass molding having an optical surface according to claim 1, wherein said crossing angle is more than or equal to 45 degrees and is less than 50 degrees.

11. The method of manufacturing a glass molding having an optical surface according to claim 1, wherein said side portion has a linear cross-section from an edge of said bottom portion to said outer peripheral planar portion.

12. A method of manufacturing a glass molding using a lower mold and an upper mold, the method comprising:
preparing an upper mold and a lower mold, wherein said lower mold comprises:
a recess comprising a bottom portion and a side portion surrounding said bottom portion; and
an outer peripheral planar portion surrounding an upper end of said side portion, wherein a crossing angle between said side portion and said outer peripheral planar portion being set at more than or equal to 45 degrees;
dropping a molten glass drop onto said lower mold, and
press molding said molten glass drop dropped onto said lower mold with said lower mold and said upper mold;
wherein a first part of said molten glass drop fills said recess and a second part of said molten glass drop is located above said outer peripheral planar portion, and wherein a volume of said dropped molten glass drop being such that, when dropped onto said lower mold, a volume of said second part of said molten glass drop is 4.0 times to 6.0 times a volume of said first part of said molten glass drop so that said second part of said molten glass drop is rounded with centripetal force generated by surface tension of said molten glass drop acting on said first part of said molten glass drop, so that a contact of said molten glass with said outer peripheral planar portion is restrained at a time when said molten glass drop is dropped toward said lower mold.

13. The method of manufacturing a glass molding having an optical surface according to claim 12, wherein a central position of said molten glass dropped onto said lower mold coincides with a central position of said bottom portion.

14. The method of manufacturing a glass molding according to claim 12, wherein said dropping comprises dropping said molten glass toward a position displaced from a central position of said bottom portion by an amount ranging from 0.10 to 0.30 mm.

15. The method of manufacturing a glass molding according to claim 12, wherein said recess is centered about a central portion of said lower mold.

16. The method of manufacturing a glass molding according to claim 12, wherein said bottom portion is parallel to a plane containing said outer peripheral planar portion.

17. The method of manufacturing a glass molding according to claim 12, wherein said crossing angle is more than or equal to 45 degrees and is less than 50 degrees.

18. The method of manufacturing a glass molding according to claim 12, wherein said side portion has a linear cross-section from an edge of said bottom portion to said outer peripheral planar portion.

19. A method of manufacturing a glass molding using an upper mold and a lower mold, the method comprising:
preparing an upper mold and a lower mold, wherein said lower mold comprises:
a recess comprising a bottom portion and a side portion surrounding said bottom portion; and
an outer peripheral planar portion surrounding an upper end of said side portion, wherein a crossing angle between said side portion and said outer peripheral planar portion being set at more than or equal to 45 degrees;
dropping a molten glass drop onto said lower mold, and
press molding said molten glass drop dropped onto said lower mold with said lower mold and said upper mold;
wherein a first part of said molten glass drop fills said recess and a second part of said molten glass drop is located above said outer peripheral planar portion, and wherein a volume of said dropped molten glass drop being such that, when dropped onto said lower mold, a volume of said second part of said molten glass drop is 4.0 times to 6.0 times a volume of said first part of said molten glass drop so that said second part of said molten glass drop is rounded with centripetal force generated by surface tension of said molten glass drop acting on said first part of said molten glass drop, so that a gap between molten glass filling said recess and said inner surface of said recess is not present at a time when said molten glass drop is dropped toward said lower mold.

20. The method of manufacturing a glass molding according to claim 19, wherein a central position of said molten glass dropped onto said lower mold coincides with a central position of said bottom portion.

21. The method of manufacturing a glass molding according to claim 19, wherein said dropping comprises dropping said molten glass toward a position displaced from a central position of said bottom portion by an amount ranging from 0.10 to 0.30 mm.

22. The method of manufacturing a glass molding according to claim 19, wherein said recess is centered about a central portion of said lower mold.

23. The method of manufacturing a glass molding according to claim 19, wherein said bottom portion is parallel to a plane containing said outer peripheral planar portion.

24. The method of manufacturing a glass molding having an optical surface according to claim 19, wherein said crossing angle is more than or equal to 45 degrees and is less than 50 degrees.

25. The method of manufacturing a glass molding according to claim 19, wherein said side portion has a linear cross-section from an edge of said bottom portion to said outer peripheral planar portion.

* * * * *